US008783651B2

(12) United States Patent
Gautschi et al.

(10) Patent No.: US 8,783,651 B2
(45) Date of Patent: Jul. 22, 2014

(54) SANITARY FITTING WITH A JOINT

(75) Inventors: Christian Gautschi, Sursee (CH); Daniel Baumann, Schmiedrued (CH)

(73) Assignee: KWC AG, Unterkulm (CH)

( * ) Notice: Subject to any disclaimer, the term of this patent is extended or adjusted under 35 U.S.C. 154(b) by 617 days.

(21) Appl. No.: 12/707,230

(22) Filed: Feb. 17, 2010

(65) Prior Publication Data

US 2010/0206409 A1 Aug. 19, 2010

(30) Foreign Application Priority Data

Feb. 17, 2009 (EP) .................................... 09002168

(51) Int. Cl.
*F16K 31/02* (2006.01)

(52) U.S. Cl.
USPC .................... 251/129.04; 200/6 A; 236/12.12

(58) Field of Classification Search
USPC .................... 251/129.04; 200/6 A; 236/12.12
See application file for complete search history.

(56) References Cited

U.S. PATENT DOCUMENTS

| | | | | |
|---|---|---|---|---|
| 3,653,407 | A | 4/1972 | Katva | |
| 4,459,578 | A * | 7/1984 | Sava et al. | 338/128 |
| 4,479,038 | A | 10/1984 | Marhold et al. | |
| 4,489,303 | A * | 12/1984 | Martin | 338/128 |
| 5,010,922 | A * | 4/1991 | Agresta | 137/359 |
| 5,151,563 | A | 9/1992 | Tanaka | |
| 5,850,142 | A * | 12/1998 | Rountos et al. | 324/207.2 |
| 5,988,593 | A | 11/1999 | Rice | |
| 6,256,986 | B1 | 7/2001 | Langen et al. | |
| 6,295,810 | B1 | 10/2001 | Langen et al. | |
| 6,352,179 | B1 | 3/2002 | Andersen et al. | |
| 6,367,707 | B1 | 4/2002 | Kang | |
| 6,403,898 | B2 * | 6/2002 | Janniere et al. | 200/6 A |
| 6,755,195 | B1 | 6/2004 | Lemke et al. | |
| 6,884,948 | B2 * | 4/2005 | Gotoh | 200/6 A |
| 7,150,293 | B2 | 12/2006 | Jonte | |
| 7,227,090 | B2 * | 6/2007 | Kakuno et al. | 200/6 A |
| 7,242,390 | B2 | 7/2007 | Bader et al. | |
| 7,275,370 | B2 | 10/2007 | Hesse et al. | |
| 7,537,023 | B2 | 5/2009 | Marty et al. | |

(Continued)

FOREIGN PATENT DOCUMENTS

| | | |
|---|---|---|
| DE | 32 31 214 A1 | 2/1984 |
| DE | 298 07 233 U1 | 8/1998 |

(Continued)

OTHER PUBLICATIONS

European Search Report with English-language Translation mailed Nov. 30, 2009 for European Patent Application No. 09002168.4.

(Continued)

*Primary Examiner* — John Fox
(74) *Attorney, Agent, or Firm* — Oliff PLC

(57) ABSTRACT

A sanitary fitting includes a joint arrangement having a support connection piece that defines an abutment face that is at least approximately flat; a joint part that rests flat against the abutment face by way of an at least approximately flat mating face, and defines a neutral position; a spring that is supported at one end against the support connection piece and at the other end against the joint part, the spring using a spring force to push the joint part against the abutment face by way of the mating face; and a rod-like extremity that is arranged on the joint part at a fixed angle in relation to the mating face.

27 Claims, 3 Drawing Sheets

(56) References Cited

U.S. PATENT DOCUMENTS

| | | | |
|---|---|---|---|
| 2002/0149565 | A1 | 10/2002 | Sako |
| 2006/0130907 | A1 | 6/2006 | Marty et al. |
| 2006/0186215 | A1 | 8/2006 | Logan |
| 2006/0192161 | A1 | 8/2006 | Kuna et al. |
| 2007/0151613 | A1 | 7/2007 | Hahn et al. |

FOREIGN PATENT DOCUMENTS

| | | | |
|---|---|---|---|
| DE | 103 04 595 | B3 | 10/2004 |
| DE | 20 2004 006 110 | U1 | 9/2005 |
| DE | 10 2004 051 525 | A1 | 4/2006 |
| DE | 10 2006 017 598 | A1 | 10/2006 |
| DE | 10 2006 028 227 | A1 | 12/2006 |
| DE | 10 2006 028 228 | A1 | 12/2006 |
| EP | 0 400 633 | A2 | 5/1990 |
| EP | 2 023 359 | A1 | 2/2009 |
| GB | 2 040 465 | A | 8/1980 |
| KR | 101 995 000 4212 | B1 | 4/1995 |
| WO | WO 2006/091170 | A1 | 8/2006 |
| WO | WO 2006/098795 | A2 | 9/2006 |
| WO | WO 2007/129504 | A1 | 11/2007 |
| WO | WO 2009/019731 | A2 | 2/2009 |

OTHER PUBLICATIONS

European Search Report with English-language Translation mailed Jul. 24, 2009 for European Patent Application No. 09002169.2.

* cited by examiner

SANITARY FITTING WITH A JOINT

CROSS-REFERENCE TO RELATED APPLICATION

This application claims priority from European Patent Application No. EP 09 002 168.4, filed Feb. 17, 2009, the entire disclosure of which is incorporated herein by reference thereto.

BACKGROUND

The present invention relates to a sanitary fitting.

Joints and joint arrangements of various types are used in a very wide variety of areas of application. A joystick with a joint is known, for example, from GB 2040465. This joystick has a tension spring which is firmly clamped in at one end, is firmly connected to an operating lever at the opposite end, and is free in the central region. The tension spring therefore forms a joint for the operating lever. This joystick has the inherent feature that corresponding deflection takes place immediately when a force is applied to the operating lever, this deflection likewise increasing as the force increases, depending on the characteristic of the selected compression spring. However, this has the result that the relatively minimal force has to be applied in order to produce a deflection in the region of a neutral position, and even unintentional contact can lead to deflection and, as a result, to an output signal.

SUMMARY

It is an object of the present invention to provide a sanitary fitting with a joint arrangement, with this joint arrangement avoiding the abovementioned disadvantages by deflection being performed only starting from a specific loading value.

This object is achieved by a sanitary fitting having a joint arrangement, a joint part, as part of a joint arrangement, resting against said abutment face by way of its at least approximately flat mating face, as a result of which an unambiguous neutral position is defined. The abutment is ensured by means of a compression spring which is braced against the support connection piece. In order to lift the mating face away from the abutment face and therefore to move the joint part and the extremity, which is connected to it, for the purpose of deflection out of the neutral position, an external force which is greater than a specific limit force has to be applied to the extremity. This force forms a moment about a moment pole, this in turn causing the mating face to be lifted away from the abutment face, with the exception of the region with the moment pole. The moment pole continues to lie at that radially outermost point of the peripheral boundary of the first mating face at which the lowest resistance moment is counteracted. The limit force and also the limit moment are dependent on the prestressing force of the compression spring and the prevailing geometric conditions. In a special case, when the force acts coaxially to the neutral axis, it would be feasible for the entire mating face to be lifted away. The moment pole would lie at infinity, the force would correspond exactly to the spring force and would now be dependent only on the spring characteristic but not on the geometric conditions; selective deflection would not be possible. The angle assumed by the mating face in relation to the abutment face corresponds to the angle assumed by the extremity in relation to its neutral position.

In this case, the compression spring is preferably designed as a helical spring since this type of spring is cost-effective and widely available and low maintenance, has a virtually unlimited service life, and, in the present case, can be inserted in a space-saving manner on account of the prevailing geometric prespecifications. In addition, it provides the option of realizing exactly matched spring characteristics and ensuring simple replaceability.

The support connection piece, which is firmly geometrically connected to the abutment face, defines a longitudinal axis which preferably runs at right angles to the abutment face and preferably forms the neutral axis for the neutral position of the joint arrangement, in order, in this preferred form, to form a solution which is as space-saving as possible.

While the axial orientation of the joint part is defined by abutment against the firmly arranged abutment face, the radial orientation of said joint part is always determined by virtue of its radial stop which interacts with a mating stop which is firmly geometrically connected to the support connection piece. In the case of forces below the limit force, the neutral position, that is to say an orientation of the joint part which is central with respect to the neutral axis, and also full-surface contact between the abutment face and mating face, is always ensured.

An elastic sealing flange is provided in a preferred embodiment, said elastic sealing flange protecting the joint part from environmental influences in every position and allowing only the extremity to project into the outer surrounding area.

In a preferred embodiment, the mechanical part of the sanitary fitting is divided into two structural units, with one unit serving for operator control purposes and the second unit conducting water. In this case, the operator control unit is designed as an electromechanical joystick and the water-conducting part is designed as an outlet unit. Any further components, such as mixing devices or an electronic control system, can be accommodated in separate units.

The advantages of multipartite sanitary fittings of the present preferred type are greater freedom in terms of design and also in terms of physical arrangement at the site of installation.

Furthermore, an extremely wide variety of requirements are placed, for example, on puristic operator control elements, on intuitive operability which is as simple as possible, increased operator convenience due to low operator control forces, on short operator control paths or exact meterability. The requirement for reduction to a single operator control element which triggers additional functions, for example by a different operator control speed, interval or duration, is realized by means of a joystick in the present case. This joystick contains a joint arrangement.

In the case of the joystick, the extremity is designed as an operating lever. The deflection of the joint arrangement and therefore of the operating lever out of the neutral position is detected by means of a sensor in this case.

The sensor specifically comprises individual Hall sensors which are arranged on a printed circuit board which is fixed to the housing and interact with a magnet which is rigidly connected to the first joint part.

In a further preferred embodiment, the status of the sanitary fitting can be displayed to the user by way of a light signal at the free end of the operating lever.

In a further embodiment, preferred deflection directions can be prespecified for the operating lever, on account of the geometric design of the joint arrangement, for reasons of resistance, and therefore the operator preferably executes these. In addition, the operating lever is secured against twisting.

Since the outlet unit can also be designed as a second mechanical unit and a water-conducting part of the sanitary fitting can be designed in a sophisticated manner in accordance with the high significance of the design in the case of sanitary fittings of the present preferred type, the outlet pipe is designed to be as slim and therefore to have as thin walls as possible. As a result, the outlet pipe becomes more sensitive to damage caused by unintentional mechanical impact loading as the length increases. When the outlet pipe is mounted rigidly relative to its surrounding area, preferably at the clamping site where an impact force generates the greatest moment, this can lead to damage such as bending or buckling. To remedy this, the outlet unit contains, in the interior of its support connection piece which is firmly connected to the surrounding area and forms the base body, a joint arrangement according to the invention. The extremity which is connected to the joint arrangement is formed by the outlet pipe. At the input end, said outlet pipe is connected to a mixed water line.

In this case, a connection part is advantageously fitted to the lower end of the joint part and forms a flow connection with the outlet pipe. For its part, this connection part projects out of the lower end of the support connection piece.

In a preferred embodiment of the outlet unit, the sanitary fitting has an annular centering disk which is fitted between a stop face and the mating face of the second joint part and has a damping influence on pivoting movements of the outlet pipe. In addition, the outlet pipe can be rotatably mounted in the second joint part.

In a further preferred embodiment, the sanitary fitting has, in the outlet unit, a light source, preferably an LED, of which the light illuminates the jet of water in the outlet pipe as it emerges. In a particularly preferred embodiment, an additional light guide is present in the outlet pipe, said light guide reducing scatter losses from the emitted light in the outlet pipe.

BRIEF DESCRIPTION OF THE DRAWINGS

The present invention will be explained in greater detail with reference to an exemplary embodiment which is illustrated in the drawing, in which, purely schematically.

DETAILED DESCRIPTION OF EMBODIMENTS

Figure 1:
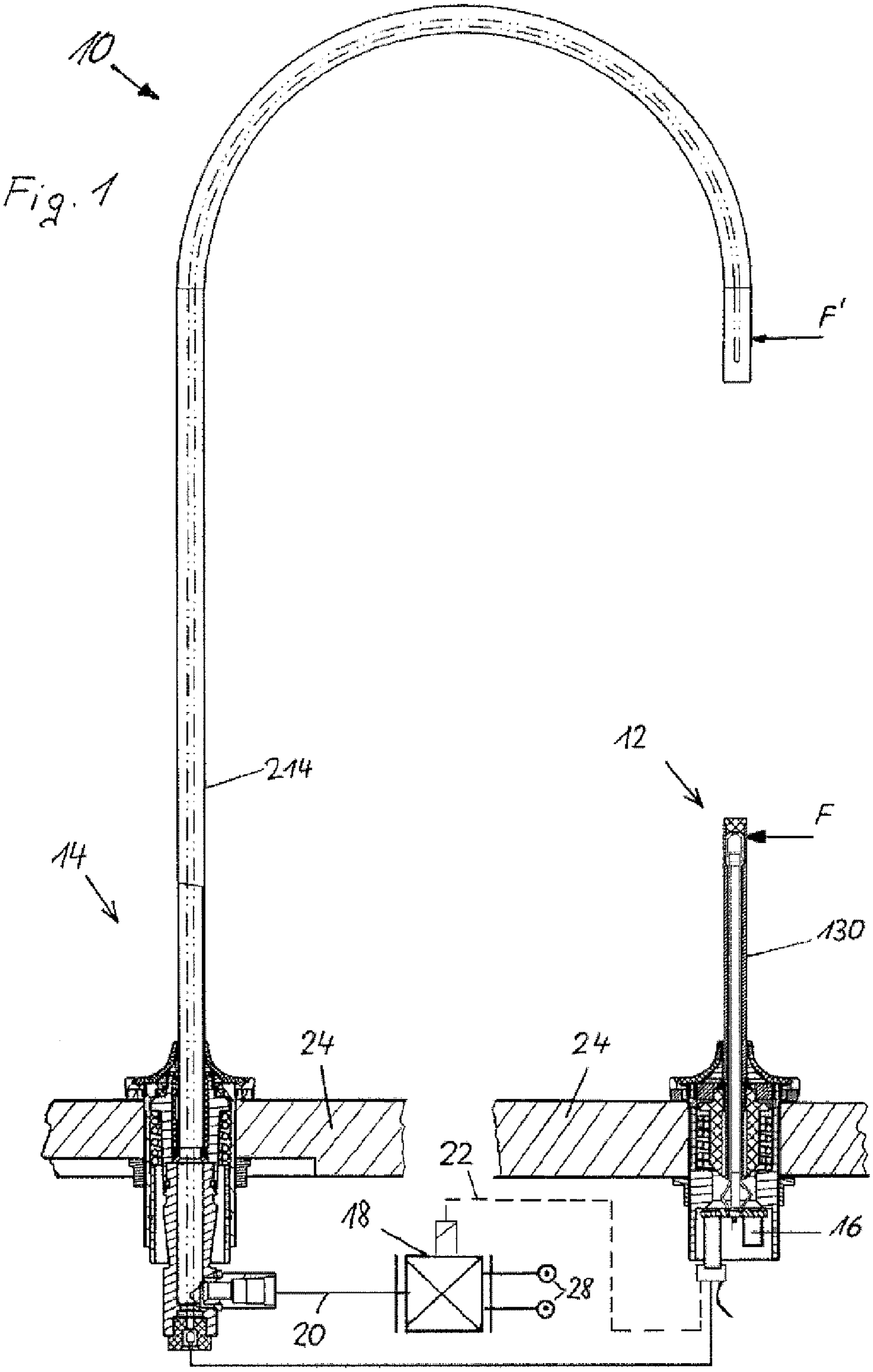
FIG. 1 shows a longitudinal section through a sanitary fitting according to the invention with an operator control unit and an outlet unit in the installed state, with additional actuating elements, control electronics, electric cables and water lines being illustrated.

The sanitary fitting 10 according to the invention shown in FIG. 1 relates to a particularly preferred embodiment of a washstand fitting. Said sanitary fitting comprises an operator control unit 12 in the form of a joystick, a water-conducting outlet unit 14, an electronic control system 16 which is preferably integrated in the operator control unit 12, a mixing valve unit 18 with a mixed water line 20 connected to the output of said mixing valve unit, and an electric connection line 22 between the electronic control system 16 and the mixing valve unit 18, with the washstand fitting being intended to be mounted on the top 24 of the stand in a known manner.

The operator control unit 12 preferably allows the user to steplessly choose the water temperature by deflecting a preferably lever-like extremity 26 in a first main plane and also to choose the quantity of water by operating this extremity 26 in a second main plane, preferably at a right angle to the first main plane. It is possible in each case to set different combinations of water temperature and quantity of water by deflection in any other plane between these two main planes. The operator control unit 12 converts the choice of the user into electrical signals which are converted by the electronic control system 16 into actuating signals for the mixing valve unit 18, to the input end of which a cold- and a hot-water feed line 28 are connected and to the output end of which the mixed water line 20 is connected, the input end of said mixed water line being directly connected to the outlet unit 14. Since control is performed electronically, further additional functions, such as lighting for example, can be incorporated in the operator control unit 12. In a preferred embodiment, light is emitted at the end face of the operating lever 26, said light being activated by the electronic control system 16 and informing the user about the status of the sanitary fitting 10.

The electronic control system 16 and its control logic are disclosed in particular detail in European patent application (representative reference A18633EP) which was submitted by the same applicant at the same time and of which the content is incorporated by reference.

Sanitary fittings of the present type have to satisfy an extremely wide variety of requirements, for example operability which is as simple and intuitive as possible, low operator control forces, exact meterability, short operator control paths or defined threshold resistances, and moreover have operator control elements which are as simple as possible.

Figure 2:
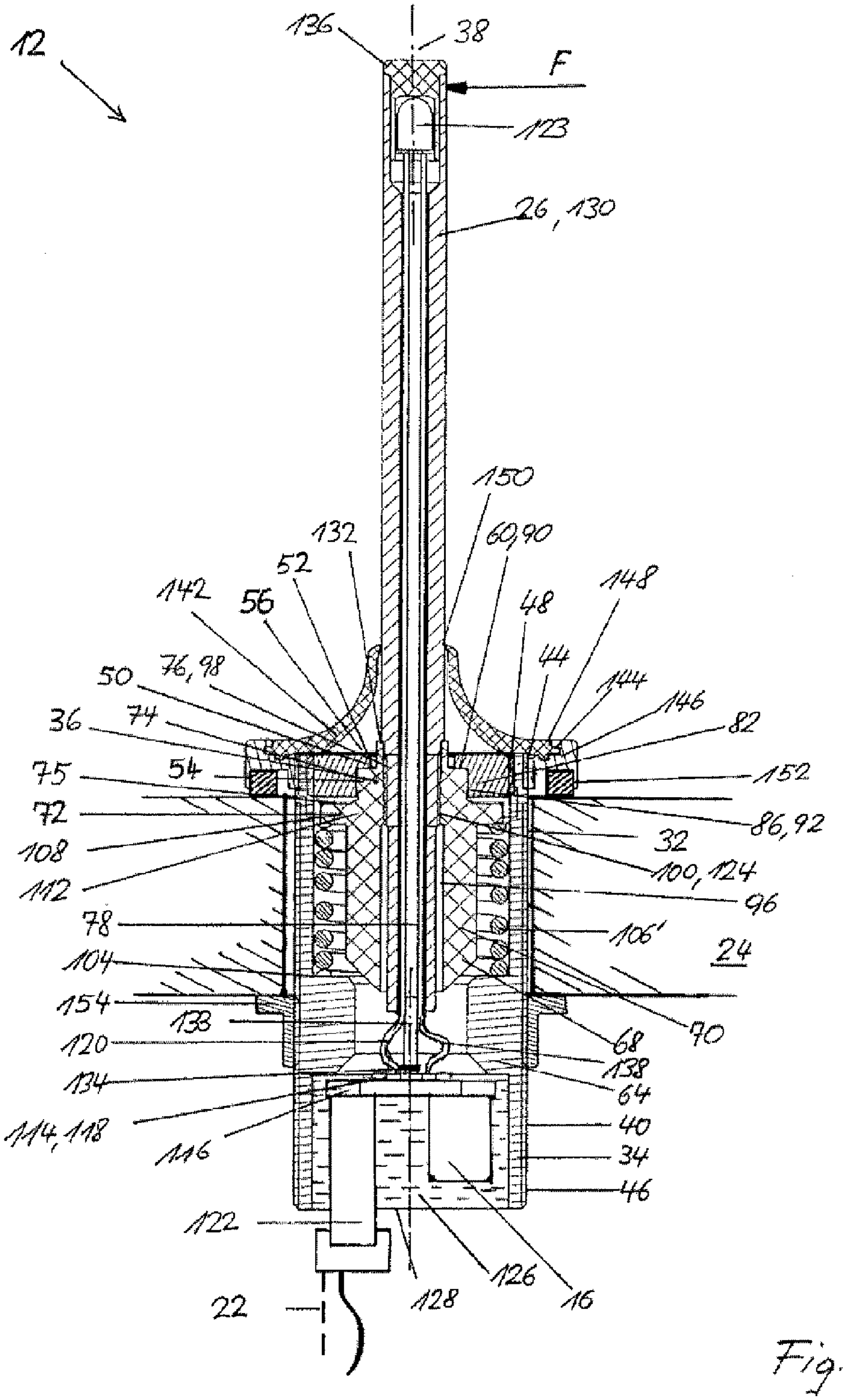
FIG. 2 shows a longitudinal section, which is enlarged compared to FIG. 1, of the operator control unit of the sanitary fitting according to the invention in the installed state.

The operator control unit 12 which is illustrated in FIG. 2 on an enlarged scale in relation to FIG. 1 is in the neutral position, and therefore is in the unoperated state in which no external force acts on said operator control element. In this embodiment, the joystick 12 is intended to be mounted in a passage hole 32 in the top 24 of the stand or a wash basin.

A sleeve-like support connecting piece 34 forms the supporting base body of the operator control unit 12. By way of its symmetrical axis which runs at a right angle to the top 24 of the stand in the mounted state, said support connection piece forms a neutral axis 38 for the moving components of the operator control unit 12, in particular a joint arrangement 36. The support connection piece 34 has, on the outer casing surface 40, at its upper end, a short thread 44 and, starting from the opposite lower end, an external thread 46 over virtually the remaining length of the cylindrical casing surface 40. The length of the thread-free region on the casing surface 40 may reach, at most, the thickness of the top 24 of the stand. The two threads 44, 46 preferably have the same direction. In addition, a thread which continues over the entire length of the support connection piece 34 is feasible.

The operator-side upper end of the support connection piece 34 has a disk nut 50 which is screwed into an internal thread 48 and, by way of its outer face, terminates at least approximately flush with the end face of the support connection piece 34. The disk nut 50 has, coaxially to the neutral axis 38, a stepped passage hole 52, of which the first hole section 54 which faces inward has a larger diameter than the outer, second hole section 56 of said stepped passage hole. The gradation forms a circular, flat abutment face 60 which is oriented at a right angle to the neutral axis 38. A peripheral inner shoulder 64 of constant depth and width is formed in the interior of the support connection piece 34, starting from the upper end of said support connection piece in FIG. 2, in the region of the lower third. The support connection piece 34 accommodates a first joint part 68 between the inner shoulder 64 and the disk nut 50.

The first joint part 68 itself has a cylindrical base body 70 with a radially projecting and peripheral collar 72 which is mounted flush at the operator-side end face of said joint part. A stub-like projection 74 of relatively small diameter is coaxially and integrally formed on said flat end face, with a tubular, coaxial mouth 76 in turn being integrally formed on said projection. The first joint part 68 defines a joint part shaft 78 which coincides with the neutral axis 38 in its neutral position.

The first hole section 54 of the stepped passage hole 50 of the disk nut 50 forms a joystick bearing 82 for the first joint part 68, comprising the abutment face 60 and a circular-cylindrical inner side wall 86 which is coaxial to the neutral axis 38 and assumes the function of the radial stop for the joint part. The contour of the inner side wall 86 can assume the shape of a polygon, in particular an equilateral octagon, instead of a circular shape.

The first joint part 68 is accommodated by the joystick bearing 82, at the projection 74 of said joint part. The shape and dimensions of the projection 74 are matched radially and axially to the joystick bearing 82.

A first flat end face of the projection 74 interacts, as a mating face 90, with the abutment face 60, as a result of which a one-sided stop is formed in the axial direction.

An outer side wall 92 of the projection 74 is oriented coaxially to the joint part axis 78 and is formed in the same way but opposite to the inner side wall 86 while maintaining radial play which is as low as possible. The radial play serves the purpose of allowing deflection out of the neutral position.

When the projection 74 is fully accommodated in the joystick bearing 82, the abutment face 60 and the first mating face 90 lie against one another with full-surface contact and the first joint part 68 is oriented in the direction of the neutral axis 38 and is therefore in the neutral position.

The inner side wall 86 has the effect of radially centering the first joint part 68. In order to allow the projection 74 of the first joint part 68 to be deflected out of the neutral position, a certain amount of radial play is required. This can be reduced by suitable shaping of the inner and outer side walls 86, 92, with point- or line-like raised areas also being feasible both on the inner and the outer side wall 86, 92.

The advantage of forming the contours of the inner side and outer side walls 86, 92 as polygons is that twisting of the first joint part 68 in relation to the support connection piece 34 is effectively prevented. In addition, deflection of the first joint part 68 across the corners of a polygon requires more force than across the side edges of said polygon, as a result of which preferred directions are prespecified to the operator during the deflection process. In this case, the tubular mouth 76 of the first joint part 68 projects through the second hole section 56 in the stepped passage hole 52 of the disk nut 50, while maintaining a radial gap, out of the support connection piece 34 and forms, by way of its free end, the stop for the extremity 26.

The first joint part 68 has a passage hole 96 which runs coaxially to the joint part axis 78 and has a diameter which corresponds to the inside diameter 98 of the tubular mouth 76. Furthermore, a threaded section 100 is located in this passage hole 96. That end of the first joint part 68 which is averted from the mouth 76 and forms the lower end of said joint part tapers conically toward the outside and is dimensioned in such a way that a defined radial distance from the inner shoulder 64 is ensured in the neutral position. This distance determines the maximum possible deflection and the inner shoulder 64 serves as a limiting stop.

The support connection piece 34 contains a helical compression spring 106 which is coaxial with respect to the neutral axis 38 and in this case surrounds the joint part 68 while maintaining radial play. The compression spring 106 which is always oriented coaxially to the support connection piece 34 is axially inserted, by way of its end faces, between that shoulder flank 104 of the peripheral shoulder 64 which faces the operator side and that collar lower flank 112 of the collar 72 which faces said shoulder flank, while maintaining a certain amount of prestress.

This compression spring 106 serves to transmit any loading from the first joint part 68 to the support connection piece 34 and, in the neutral position of the first joint part 68, to push said joint part into the joystick bearing 82 in the axial direction by virtue of a certain amount of prestress. The first joint part 68 is held in the coaxial neutral position illustrated in FIG. 2, up to a certain external loading, by the prestress of the compression spring 106. The joint arrangement 36 is completely defined by the compression spring 106 and the first joint part 68 in conjunction with the joystick bearing 82.

The support connection piece 34 contains a sensor 114 beneath the peripheral inner shoulder 64, said sensor being mounted on the upper face of a printed circuit board 116 which is firmly connected to the support connection piece 34 and is oriented at a right angle to the neutral axis 38. In the present case, the sensor 114 comprises four Hall sensors 118 which are preferably arranged in the direction of the main planes and in pairs diametrically in relation to one another with respect to the neutral axis 38. The output signals from said sensors are processed by the electronic control system 16. The signals from said electronic control system are conducted to flexible electrical conductors 120 and to a signal interface in the form of a plug connection 122 on the lower face of the support connection piece 34. This plug connection 122 serves to supply power to the electronic control system 16 and to a light source 123 and also serves for signal interchange between the electronic control system 16 and external devices, specifically the mixing valve unit 18. The electrical conductors 120 connect the electronic control system 16 to the light source 123. The entire region of the support connection piece 34 between the printed circuit board 116 and the lower end of the support connection piece 34 is filled with a rapidly curing material, preferably with a synthetic resin 126, until it is flush. The printed circuit board 116 itself is encapsulated at least at that face which is averted from the Hall sensors 118.

An extremity 26 is rigidly connected to the first joint part 68. This extremity 26, which represents a tubular operating lever 130, is straight and tubular and continues through the first joint part 68 as far as close to the printed circuit board 116. In the first joint part 68, approximately a third of the length of said extremity is screwed into the threaded section 100, the remaining two thirds projecting, starting from the tubular mouth 76, freely into the operator control space. The threaded-in lower third has a reduced diameter and the change in diameter is sudden, as a result of which a circular supporting shoulder 132 is formed and interacts with the end face of the tubular mouth 76 in such a way that it is braced against the first joint part 68 in the screwed-in state of the operating lever 130 and the threaded section 100 is preferably additionally secured by means of adhesive bonding. At the sensor-side end, the operating lever 130 has a pin 133 which protrudes coaxially out of the interior of said operating lever and has mounted on its end face a permanent magnet 134 which interacts with the sensor 114, as a result of which this sensor can convert each deflection of the operating lever 130 out of the neutral position into unambiguous signals.

The operator control-side free end of the operating lever 130 has an end-face covering 136 comprising transparent material. According to FIG. 2, the light source 123 is connected to the electronic control system 16 by current conductors 138, which are conducted in the operating lever 130, inside the pipe behind this covering 136.

As an alternative, it is possible to fit a light source 123 in the lower end region of the operating lever 130, and in this case the light would be conducted to the free end of the operating lever 130 via a light guide inside the lever, in order to be emitted there.

It is advantageous when the light source 123 emits at least two color states, preferably red and blue, to provide information about the water temperature. In a further advantageous embodiment, the light source 123 changes color between red and blue or adapts the luminous force to the conditions. As an alternative, different luminous intensities would be feasible, for example to provide information about the quantity of water set. The light source 123 is preferably realized by means of an LED.

A clearance remains between the stepped passage hole 52 and the operating lever 130, which is passed through, for functional reasons, it being possible for foreign bodies to enter the joint arrangement 36 through said clearance. In order to prevent ingress, a seal is provided which effectively seals off this clearance every time the operating lever 130 is deflected, and additionally corresponds as well as possible to the stylistic features of the armature fitting in the operator control space. To this end, a coaxially inserted annular flange 142 comprising rubber-like material is provided, said flange covering the entire support connection piece 34.

By way of its outer edge 148, the flange 142 is inserted, and therefore fixed, in a flush and interlocking manner in a coaxially peripheral groove 144 in the upper face of coaxial base plate 146, with the operator control space-side surface of the flange 142 merging flush with the surface of the base plate 146. The base plate 146 has a preferably circular, square or alternately adapted outer contour and is screwed onto and firmly braced on the short thread 44 of the support connection piece 34 from the upper end, with the region with the peripheral groove 144 projecting axially beyond the support connection piece 34 in such a way that the inserted flange 142 rests on the end face of the support connection piece 34 at best without load. By way of the inner edge 150 of its central opening, said flange tangentially adjoins the operating lever 130 in such a way that it follows every deflection of the operating lever 130 without the interlocking connection and consequently the seal being broken.

A peripheral seal 152 with a rectangular cross section is fitted to the lower face of the base plate 146, said seal preventing dirt and moisture entering the contact region between the operator control panel 12 and the top 24 of the stand and additionally being able to compensate for unevennesses and deviations in parallelism when the support connection piece 34 is fixed to the top 24 of the stand. The base plate 146 defines the overall height of the operator control unit 12 relative to the top 24 of the stand. The support connection piece 34 is fixed by a fastening nut 154 to the external thread 46 at the lower end of the support connection piece 34 which is braced against the base plate 146.

FIG. 2 illustrates the operator control unit 12 in the neutral position. In the neutral position, when the joint part axis 78 and the neutral axis 38 coincide, the abutment face 60 and the first mating face 90 rest against one another over the entire surface and the first joint part 68 is in the defined axial position, and accordingly the operating lever 130 is oriented coaxially to the neutral axis 38. The abutment face 60 and the first mating face 90 are held with full-surface abutment by the helical compression spring 106, which acts in the axial direction, up to a specific loading limit value. Radial centering of the first joint part 68 within the support connection piece 34 is ensured by the inner side walls 86 in conjunction with the outer side walls 92.

If the operator now radially applies a lateral force F to the operating lever 130, this produces a lateral moment of force about a moment pole. This moment pole is situated at that radially outermost point at which the abutment face 60 and the first mating face 90 make contact. In the present case, the moment pole is always located at the outermost edge of the first mating face 90 at its contour. The product of the resulting spring force of the compression spring 106 and the distance between said compression spring and the moment pole acts as the countermoment about this moment pole.

As soon as the lateral moment of force applied by the lateral force F exceeds a specific countermoment—the limit moment—, the operating lever 130 and the associated first joint part 68 are deflected and the first mating face 90 of the first joint part 68 is partly lifted away from the abutment face 60 about this moment pole. The first joint part 68 and the operating lever 130 are pivoted out of the neutral position by the same angle. The flat contact between the abutment face 60 and the first mating face 90 becomes a point contact, and in the case of a joystick bearing 82 which is in the form of a polygon, the flat contact becomes a line contact.

The first joint part 68 is located in a defined radial position in each pivoting position. Uncontrolled radial displacement out of the neutral position is prevented. The compression spring 106 remains substantially in its neutral position. Only that region of the compression spring 106 which is close to the first joint part 68 experiences compression. According to FIG. 2, the deflection of the first joint part 68 is limited as soon as the first joint part 68 comes into contact with the inner shoulder 64 of the support connection piece 34.

Deflection takes place in that direction in which the lateral moment of force counteracts the lowest countermoment. The countermoment is a product of the resulting compression spring force and the resulting distance from the respective moment pole, the limit moment is a specific countermoment, defined by the prestress of the compression spring in the neutral position. Since, in a first mating face 90 with a contour which is shaped as a convex symmetrical polygon, the corners are always radially further away than the straight sides, a countermoment about the sides of the polygon is always lower than about its corners. This produces a function of the polygon which results in centering with respect to deflection.

When mounting the components, the compression spring 106 is inserted into the support connection piece 34 in a first step, and therefore said compression spring rests on the inner shoulder 64. In a further step, the first joint part 68 is inserted until its collar 72 rests on the compression spring 106. The disk nut 50 is then passed over the tubular mouth 76 by way of its stepped passage hole 52 and butts, by way of its joystick bearing 82, against the projection 74 and is screwed in until the corresponding prestress is achieved. In this case, said disk nut is screwed in with its upper face approximately flush with the support connection piece 34. Said disk nut presses the first joint part 68 against the compression spring 106 via the abutment face 60 and collar 72, said compression spring in turn being supported on the support connection piece 34. Intensified screwing-in of the disk nut 50 shortens the distance between said disk nut and the inner shoulder 64, the compression spring 106 is compressed and the spring resistance and therefore the limit moment can be set. The operating lever 130 which is premounted with the pin 133, the permanent magnet 134, the light source 123, the covering 136 and the guides 120 is then screwed into the lever threaded section 124, possibly with the aid of a corresponding adhesive. In this case, it is highly advantageous when the joint arrangement 36 has a joystick bearing 82 which is secured against twisting, as a result of which the operating lever 130 can be braced without problems.

The printed circuit board 116 with the sensor 114 on the upper face and the plug connection 122 mounted on the lower face, together with the electronic control system 16, is inserted from the lower end of the support connection piece 34 and at the same time the guides 120 are connected to the plug connection 122. The hollow space between the lower face of the printed circuit board and the lower end of the support connection piece 34 is then filled with filler 126. The base plate 146 together with the mounted flange 142 is then inserted over the operating lever 130 from the operator side and screwed to the support connection piece 34 in such a way that the flange 142 at most just touches the support connection piece 34.

When the disk nut 50, the printed circuit board 116 with the Hall sensors 118, and the base plate 146 are mounted, care should be taken that all these components are mounted in the correct position which is defined in terms of rotation with respect to one another in order to ensure correct functioning.

At the site of installation, the entire assembly on the top 24 of the stand is inserted into a stand hole 32 in the operator control space until the base plate 146 rests against the top 24 of the stand by way of its seal 152. At the opposite end of the support connection piece, a fastening nut 154, as a lock nut, is screwed onto the external thread 46 of said support connection piece from below and therefore fixes the operator control unit 12 with respect to the top 24 of the stand in a force-fitting manner.

Figure 3:
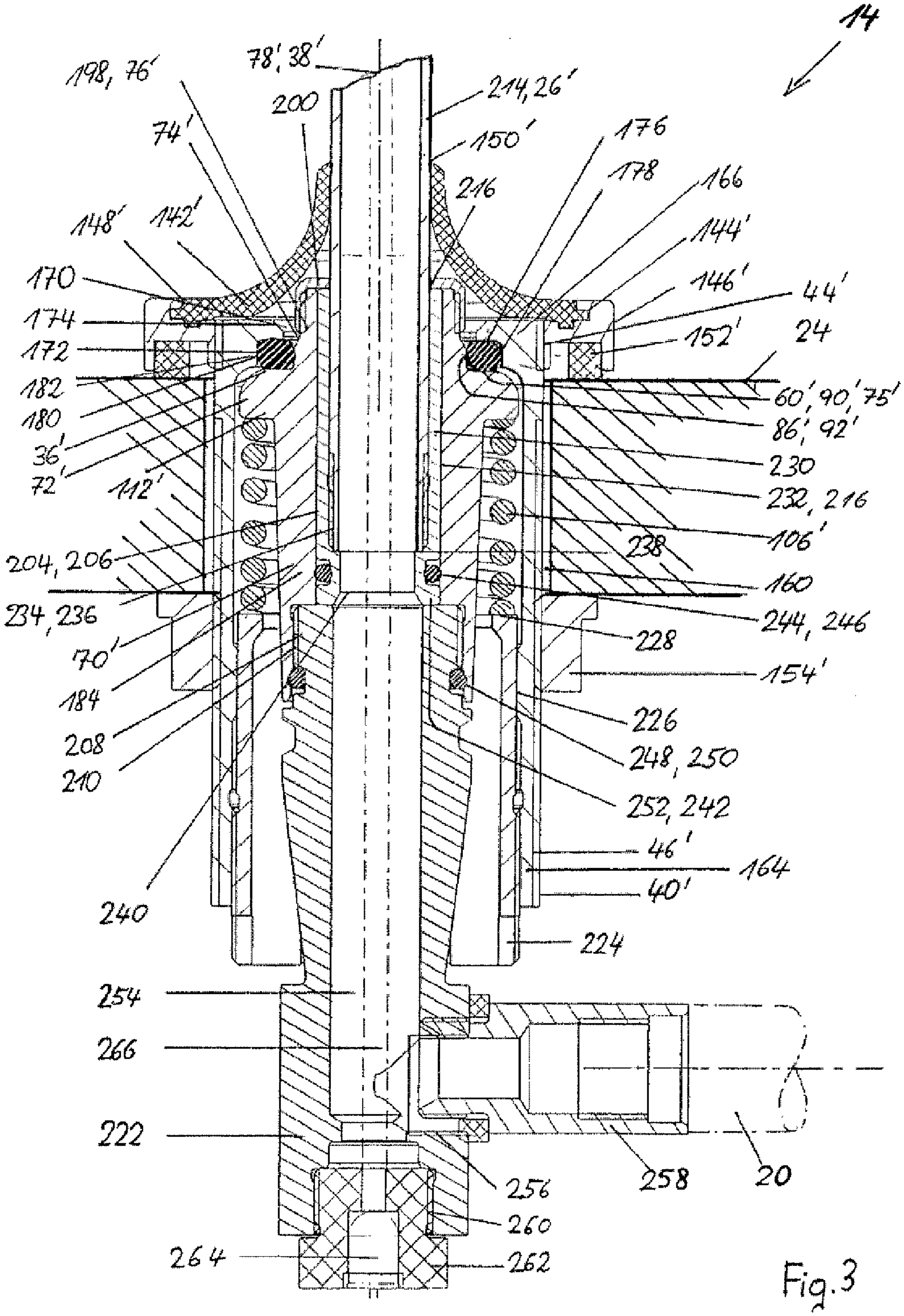
FIG. 3 shows a longitudinal section, which is enlarged compared to FIG. 1, of a portion of the outlet unit of the sanitary fitting according to the invention in the installed state.

The outlet unit 14 which is illustrated in FIG. 3 on an enlarged scale in relation to FIG. 1 is illustrated in the neutral position which shows its position both when it is ready for operation and during normal use, as long as no lateral force F which exceeds a certain loading limit acts on it. In this embodiment, the outlet unit 14 is intended to be fastened in a further stand hole 160 on preferably the same top 24 of the stand. In this case, the connection element used is—analogously to the operator control unit 12—a sleeve-like support connection piece 164 which accommodates a joint arrangement 36' in its interior.

The support connection piece 164 forms the supporting base body of the outlet unit 14. By way of its symmetrical axis, which runs at least approximately perpendicular to the top 24 of the stand in the mounted state, said support connection piece forms a neutral axis 38' for the moving components of the outlet unit 14, in particular a joint arrangement 36' which is accommodated in the interior of said support connection piece. The support connection piece 164 has, on its outer casing surface 40', starting from its upper end which faces the operator, a short thread 44' and, starting from the opposite lower end, an external thread 46' over virtually the remaining length of the cylindrical casing surface 40'. The length of the thread-free region on the casing surface 40' may correspond at most to the thickness of the top 24 of the stand. The two threads 44', 46' preferably have the same direction. As an alternative, a thread which is continuously applied over the entire length of the support connection piece 164 is also feasible.

At its top end, the support connection piece 164, in contrast to the support connection piece 34 of the operator control unit 12, forms an end shoulder 166. This end shoulder is directed radially inward and, on the outside, terminates flush with the support connection piece 164.

The end shoulder 166 has an inner contour which is formed by a stepped hole 170 which runs coaxially to the neutral axis 38'. The first section 172 of said stepped hole which faces inward has a larger diameter than the second section 174 of said stepped hole which is directed outward. The gradation forms a circular, flat stop face 176 which is oriented at a right angle to the neutral axis 38' and, together with a side wall 178 of the first section 172, accommodates a centering disk 180 in an interlocking manner, as a result of which the position of said centering disk is axially and radially determined.

The centering disk 180 is provided for the purpose of forming a radially and axially acting outlet bearing 182, accommodating a second joint part 184 and defining the axial and radial position of said second joint part.

The coaxial surface regions, which are radially close to the center, of the centering disk 180 form, when viewed axially, a contour which is symmetrical and preferably closed and circular in the present case. In the present preferred embodiment, the centering disk 180 is of virtually rectangular cross section, as a result of which a coaxial inner side wall 86', which is comparable with a circular-cylindrical casing surface, is formed as a radial stop.

Together with the surface region which is circular and coaxial to the neutral axis 38' and extends radially outward and is oriented parallel to the stop face 176, the centering disk 180 forms a circular, at least approximately flat bearing face 60'. The bearing face 60' and the inner side wall 86' define the outlet bearing 182.

Since the centering disk 180 is preferably composed of an elastic plastic, in a particularly preferred version of POM, a certain degree of deformation of the centering disk 180 can be expected, depending on the prevailing pressure conditions.

According to FIG. 3, the centering disk 180 prevents direct contact between a second joint part 184 and the support connection piece 164. Force is transmitted from the second joint part 184 to the support connection piece 164 via the centering disk 180. The centering disk 180 therefore serves to radially center the second joint part 184 at least approximately without play and to axially delimit the second joint part 184 at one end. Both when the second joint part 184 is deflected out of the neutral position and when it is returned to the neutral position, the centering disk 180 additionally has the effect of damping the beginning and end stages of this movement.

The second joint part 184 itself has an approximately cylindrical base body 70' with a peripheral and radially projecting collar 72' which is fitted in the operator-side end region and additionally is formed to be flush with the surface of the end face of the base body 70'. A stub-like coaxial projection 74' of smaller diameter is integrally formed on this flat end face, with a tubular, coaxial mouth 76' in turn being integrally formed on said projection. The second joint part 184 further defines a joint part axis 78' which coincides with the neutral axis 38' in the neutral position of said second joint part. In this position, the abutment face 60' and the mating face 90' rest against one another over the entire surface.

In the present outlet unit 14, the upper flank 75' of the collar forms the mating face 90' and interacts, in the axial direction, with the flat abutment face 60', which is oriented at a right angle to the neutral axis 38', on the centering disk 180. The cylindrical projection 74' forms the axially peripheral stop by way of its coaxial cylindrical casing surface as the outer side wall 92' and, as a result of the interaction with the inner side wall 86' of the centering disk 180, radially centers the second joint part 184.

By way of its tubular mouth 76', the second joint part 184 projects through the end face of the support connection piece 164. The tubular mouth 76' is in the form of a threaded stub 198 which serves to accommodate a union nut 200 at its end. The union nut 200 is firmly braced against the threaded stub 198. The second joint part 184 has a joint part stepped hole 204 which is oriented coaxially to the joint part axis 78', with the operator control-side, upper subregion 206 being designed with a smaller diameter than the lower subregion 208 which has an internal connection thread 210, whereas the upper subregion 206 is designed to be smooth.

The upper subregion 206 serves to indirectly accommodate an end region of the extremity 26' which, in the present case, is formed by an outlet pipe 214.

The lower region 208 of the joint part stepped hole 204 with its internal connection thread 210 serves to accommodate a connection part 222 which can practically be considered to be an extension of the second joint part 184. It would be feasible to integrate the connection part 222 in the second joint part 184 and design these to be integral; however, in this case, care should be taken to maintain the ease of mounting.

The support connection piece 164 comprises a prestressing sleeve 224 which is concentrically screwed into an internal thread section 226 in the lower half of the sleeve-like support connection piece 164. The prestressing sleeve 224 forms, by way of its end face which faces the interior of the support connection piece 164—in a functionally analogous manner to the inner shoulder 64 of the operator control unit 12—a ring supporting face 228 for a helical compression spring 106' and its wall thickness is therefore designed for this compression spring 106'. Said ring supporting face is located in the support connection piece 164 and is oriented coaxially to the neutral axis 38'.

The compression spring 106' wraps around the second joint part 184 with a sufficient radial distance to not impede any deflection of said joint part in its interior and its outside diameter is smaller than the inside diameter of the support connection piece 164. The compression spring 106' is axially inserted between the facing lower flank 112' of the collar 72' and the ring supporting face 228 under a certain prestress, as a result of which axial contact between the second joint part 184 and the centering disk 180 of the outlet bearing 182 is guaranteed.

The compression spring 106' transmits to the prestressing sleeve 224 a prestressing force which is present in any case, the inherent weight of the second joint part 184 and all associated parts including a proportion of the weight of the mixed water line 20. In addition, the compression spring 106' serves to cushion any external loading which may occur on the outlet pipe 214 and therefore on the second joint part 184, starting from a specific loading limit value.

The compression spring 106' can be prestressed in accordance with requirements by a variable insertion depth of the prestressing sleeve 224 on the support connection piece 164. In the neutral position, the compression spring 106' is compressed uniformly with its axis of symmetry likewise being oriented coaxially to the neutral axis 38'. The abutment face 60' and the mating face 90' are kept in full-surface contact by the compression spring 106' which acts on the second joint part 184 up to a certain force limit value. No radial forces act on the compression spring 106' in the neutral position. The compression spring 106', in conjunction with the second joint part 184 and the centering disk 180, completes the joint arrangement 36'.

The outlet pipe 214 is oriented coaxially to the joint part axis 78' in the operator control space and passes through the union nut 200 which is fixed to the threaded stub 198 and, to this end, has a coaxial outlet hole 216 which corresponds to the outside diameter of the outlet pipe 214 while maintaining a minimum amount of play. In this case, the union nut 200 forms, by way of its region which is radially close to the contour of the outlet hole 216, a traction stop for a sliding sleeve 230 which is firmly placed on the accommodation- or influencing-side end of the outlet pipe 214.

The length and diameter of the sliding sleeve 230 correspond to those of the upper subregion 206 of the joint part stepped hole 204, as a result of which the outlet pipe 214 is held in an axially interlocking manner in the upper subregion 206 of the joint part stepped hole 204, and therefore is prevented from being axially withdrawn in the operator-control space. The sliding sleeve 230, in interaction with the upper subregion 206, further forms a sliding fit 232 which allows the sliding sleeve 230 to rotate. The sliding sleeve 230 is preferably produced from a self-lubricating, corrosion-resistant material.

The outlet pipe 214 and the sliding sleeve 230 are connected by a screw connection 234 with an additional adhesive bond 236, with the end face of the outlet pipe 214 being braced against an inner end flank of an inner collar 238 of the sliding sleeve 230 in the screwed-in state. The remaining end-face opening 240 in the sliding sleeve 230 is congruent with the inside diameter of the outlet pipe 214, as a result of which a continuous transition is produced. The sliding sleeve 230 forms, by way of its flat end face, a vertical standing face 242, of which the end face rests against the screwed-in connection part 222, as a result of which the vertical position of the sliding sleeve 230, together with the outlet pipe 214, is defined. In the event of a force in the opposite axial direction—for example by an external traction force—the sliding sleeve 230 is supported on the union nut 200 by way of its opposite, operator-oriented end face. In order to keep the axially required play low, the length of the sliding sleeve 230 corresponds at least approximately to the length of the upper subregion 206 of the joint part stepped hole 204. The periphery of the sliding sleeve 230 has a first O-ring 244 in an annular groove 246 in order to ensure sealing to prevent water from escaping in the region of the sliding fit 232. The outlet pipe 214 according to FIG. 1 is bent in the region of the opposite outflow-side end region.

From the lower end, the connection part 222 is firmly screwed into the lower subregion 208 of the joint part stepped hole 204 in an aligned manner and coaxially oriented, with a further O-ring 248 of a further annular groove 250 ensuring sealing with respect to the second joint part 184. In the installed state, the connection part 222 forms, by way of its screwed-in connection part end face 252, an axial stop for the sliding sleeve 230. When the outlet pipe 214 is rotated by the operator in the direct contact region, a rotary relative movement takes place between the sliding sleeve 230 and the connection part 222 which is connected in a rotationally fixed manner to the second joint part 184. A seal which may be inserted would make this more difficult on account of the required axial bracing, and is therefore not provided. Sealing against leakage losses is therefore performed indirectly in the respective contact region with the second joint part 184 by the mentioned first and second O-rings 244, 248.

The connection part 222 has a cylindrical outer shape, with this being of reduced diameter at certain points in order to keep the physical dimensions of the surrounding support connection piece 164 or the prestressing sleeve 224 as small as possible, without unnecessarily restricting deflectability.

The connection part 222 forms, by way of its outer contour, the continuation of the contour of the second joint part 184. The connection part 222 has a connection hole 254 which is coaxial to the sliding sleeve opening 240 in the sliding sleeve 230 and the inside diameter of the outlet pipe 214, said connection hole preferably having the same diameter.

The connection part 222 which is firmly and coaxially connected to the second joint part 184 projects beyond the support connection piece 164 to such an extent that its free end is easily accessible. The connection part 222 has a first connection threaded hole 256 for a hose connection 258 and, in a preferred embodiment according to FIG. 3, additionally has a second connection threaded hole 260 for mounting a lighting support 262. The first connection threaded hole 256 issues into the connection hole 254 from the outside in the radial direction between the support connection piece 164 and the free end. The second connection threaded hole 260 issues coaxially into the connection hole 254, starting from the free end. A hose connection 258 is rigid and tightly screwed into the first connection threaded hole 256 and serves to accommodate a flexible mixed water line 20, which does not hinder deflection movements of the connection part 222, in a sealed manner.

According to FIG. 3, a further light source 264 in the form of an LED is inserted into the lighting support 262, the light from said light source being conducted directly into the outlet pipe 214 through the connection hole 254 in the connection part 222 in the axial direction. On account of identical connection threaded holes 256, 260, alternate connection of the lighting support 262 and hose connection 258 is possible. It goes without saying that a suitable passive closure part can be inserted instead of the lighting support 262 when illumination of the water is not desired.

In the case of illumination, various possibilities would be feasible, with illumination making sense only when mixed water flows through at the same time. Therefore, illumination may be performed by white light during operation. It would also be feasible to illuminate mixed water flowing through in different colors depending on the temperature of said mixed water and thus to inform the user about the temperature state of said mixed water.

In order to reduce the light losses due to scattering, a further light guide 266 can be inserted into the connection part 222 and outlet pipe 214, starting from the lighting support 262, and firmly connected to said lighting support. In this case, the light passes close to the free end of the outlet pipe 214, due to the light guide 266 in the interior of the pipe, in order to be emitted there. In this case, the internal cross section has to be of an adequate size.

A clearance remains between the stepped hole 170 and the outlet pipe 214 for functional reasons, it being possible for foreign bodies to enter the joint arrangement 36' through said clearance. In order to prevent ingress, a seal is provided which effectively seals off this clearance every time the outlet pipe 214 is deflected, and additionally corresponds as well as possible to the stylistic features of the sanitary fitting 10 in the operator control space.

To this end, a coaxially inserted annular flange 142' comprising rubber-like material is provided, said flange covering the entire support connection piece 164.

By way of its outer edge 148, the flange 142' is inserted, and therefore fixed, in a flush and interlocking manner in a coaxially peripheral groove 144' in the upper face of a coaxial, circular base plate 146', with the operator control space-side surface of the flange 142' merging flush with the surface of the base plate 146'.

The base plate 146' has a preferably circular, square or specifically adapted outer contour and is screwed onto, and firmly braced to, the short thread 44' of the support connection piece 164 from the upper end, with the region with the peripheral groove 144' projecting axially beyond the support connection piece 164 in such a way that the inserted flange 142' rests on the end face of the support connection piece 164 at best without load. By way of the inner edge 150' of its central opening, said flange tangentially adjoins the outlet pipe 214 in such a way that it follows every deflection of said outlet pipe without the interlocking connection, and consequently the seal, being broken.

A peripheral seal 152' with a rectangular cross section is fitted to the lower face of the base plate 146', said seal, when the support connection piece 164 is fixed to the top 24 of the stand, in addition to sealing off the contact region between said support connection piece and top of the stand against the ingress of dirt and moisture, also being able to compensate for unevennesses and deviations in parallelism. The base plate 146' defines the overall height of the outlet unit 14 relative to the top 24 of the stand. The support connection piece 164 is fixed by a fastening nut 154' to the external thread 46' at the lower end of the support connection piece 164 which is braced against the base plate 146'.

FIG. 3 illustrates the outlet unit 14 in the neutral position. In the neutral position, when the joint part axis 78' and the neutral axis 38' coincide, the abutment face 60' of the centering disk 180 and the first mating face 90' of the second joint part 184 rest against one another over the entire surface, the connection part 222 is likewise aligned with the neutral axis 38' and the compression spring 106' is uniformly compressed. If a lateral force F is now applied to the outlet pipe 214, this produces a moment about a moment pole. This moment pole is situated in a virtual plane which is defined by the neutral axis 38' and the lateral force F at that radially outermost contact point within said plane at which the abutment face 60' and the mating face 90' make contact.

The abutment face 60' and the mating face 90' are held with full-surface abutment by the helical compression spring 106', which acts in the axial direction, up to a specific loading limit value. As soon as the moment applied by the lateral force F exceeds the limit moment, the outlet pipe 214 and the associated second joint part 184 are deflected and the mating face 90' of the second joint part 184 is at least partly lifted away from the abutment face 60' about this moment pole. The second joint part 184 and the outlet pipe 214 are pivoted out of the neutral position by the same angle. The flat contact between the abutment face 60' and the mating face 90' theoretically becomes a point contact.

The joint part 184 is located in a defined radial position in each pivoting position. Uncontrolled radial displacement out of the neutral position is prevented by the centering disk 180. The compression spring 106' remains substantially in its neutral position, with the upper region experiencing asymmetrical compression. According to FIG. 3, the deflection of the second joint part 184 is limited as soon as the connection part 222 comes into contact with the prestressing sleeve 224. The limit moment is a product of the predetermined spring force in the installation position and the resulting distance of said limit moment around the respective moment pole. If loading occurs solely in the neutral direction in the direction of the top 24 of the stand, the compression spring 106' is symmetrically compressed when the loading limit value is exceeded. The mating face 90' is lifted completely away from the abutment face 60' on the centering disk 180 and the moment pole lies at infinity.

The result of this joint arrangement 36' is that the outlet pipe 214 does not have to have excessively large cross sections in order to be able to withstand overloading such as shocks and the like without changing shape.

The second joint part 184, together with the compression spring 106', is inserted into the support connection piece 164, using the centering disk 180, from the open end face of the support connection piece 164, until the centering disk 180 is in the intended position. The prestressing sleeve 224 is then screwed into the support connection piece 164 from below until it comes to rest against the compression spring 106' and the desired spring prestress, which determines the limit moment, is reached. In this case, the ring supporting face 226 comes to rest against the lower face of the compression spring 106' and thus presses the second joint part 184 against the centering disk 180 by way of its mating face 90'. Intensified screwing-in of the prestressing sleeve 224 shortens the distance between said disk nut and the collar 72', the compression spring 106' is compressed and the spring resistance and therefore the limit moment are increased.

The connection part 222, with the inserted second O-ring 248 together with the lighting support 262 which is already mounted, is then screwed into the second joint part 184.

The sliding sleeve 230 is screwed onto and adhesively bonded to the outlet pipe 214, the first O-ring 244 is then inserted and the entire unit is inserted into the second joint part 184 from above and axially secured by means of the union nut 200. The flange 142' is then inserted into the groove 144' and the base plate 146', together with a seal 152', is screwed onto the upper end of the support connection piece 164.

At the site of installation, the support connection piece 164 of the entire premounted assembly is inserted into the intended further stand hole 160 from the operator side, until the base plate 146' rests against the top 24 of the stand by way of the seal 152'. The fastening process is performed by way of a fastening nut 154' which is to be screwed from the lower face of the top 24 of the stand onto the external thread 46' of said support connection piece. The mixed water line 20 is then connected to the connection part 222 by means of a hose connection.

What is claimed is:

1. A sanitary fitting comprising:

a mixing valve unit with an input for a cold water line and a hot water line and an output on which a mixed water line is connected;

a water outlet connected to the mixed water line; and a joystick to steplessly choose at least the water temperature by controlling the mixing valve unit, wherein the joystick contains a joint arrangement including:

a support connection piece that defines an abutment face that is approximately flat;

a joint part that rests flat against the abutment face by way of at least an approximately flat mating face, and defines a neutral position;

a spring that surrounds the joint part on the outside, and includes a first end and a second end, wherein the first end of the spring is supported against the joint part, the second end of the spring is fixedly supported relative to the abutment face, and the spring uses a spring force to push the joint part against the abutment face by way of the mating face; and a rod-like extremity being in the form of an operating lever and arranged on the joint part at a fixed angle in relation to the mating face, with the joint part maintaining the neutral position when an external lateral force acts on the extremity until the lateral force exceeds a limit value that is predefined by the spring, the abutment face and the mating face and, in the process, partially lifts the mating face away from the abutment face, and the flat contact between the abutment face and the mating face becomes at least one of either a line contact and a point contact.

2. The sanitary fitting as claimed in claim 1, wherein the spring is designed as a helical compression spring.

3. The sanitary fitting as claimed in claim 1, wherein the support connection piece defines a longitudinal axis as a neutral axis that runs at a right angle to the abutment face.

4. The sanitary fitting as claimed in claim 3, wherein, in the neutral position of the joint part, the longitudinal axis of the joint part coincides with the neutral axis, and the extremity runs in the direction of the longitudinal axis of the joint part.

5. The sanitary fitting as claimed in claim 1, wherein the joint part has an outer side wall as a radial stop that interacts with an inner side wall, as a mating stop, which is firmly arranged with respect to the support connection piece, as a result of which the joint part is held in a defined radial position in each pivoting position.

6. The sanitary fitting as claimed in claim 1, further comprising an elastic flange that rests against the extremity in a sealing manner by way of an inner edge, the elastic flange being connected to the support connection piece by way of its outer edge.

7. The sanitary fitting as claimed in claim 1, further comprising:

a sensor that is firmly arranged with respect to the support connection piece detecting the deflection of the joint part.

8. The sanitary fitting as claimed in claim 7, wherein:

the sensor is mounted on a printed circuit board which is firmly connected to the support connection piece, and said sensor comprises individual sensors which interact with a permanent magnet that is rigidly connected to the joint part.

9. The sanitary fitting as claimed in claim 1, wherein a light signal can be emitted in the free end region of the tubular operating lever, with a light source being arranged either in the free end region and being supplied with power by a current conductor in the interior of the operating lever, or alternatively light being conducted into the free end region by means of a light guide which runs through the operating lever, and the free end region being selectively closed by a transparent covering.

10. The sanitary fitting as claimed in claim 1, wherein by deflecting the operating lever an operator control unit converts the deflection to an electrical signal and by means of an electronic control system this electrical signal is converted to an actuating signal for the mixing valve unit.

11. A joint arrangement comprising:

a support connection piece that defines an abutment face that is approximately flat;

a joint part that rests flat against the abutment face by way of at least an approximately flat mating face, and defines a neutral position; and a spring that surrounds the joint part on the outside, and includes a first end and a second end, wherein the first end of the spring is supported against the joint part, the second end of the spring is fixedly supported relative to the abutment face, and the spring uses a spring force to push the joint part against the abutment face by way of the mating face; wherein an extremity is arranged on the joint part at a fixed angle in relation to the mating face, with the joint part maintaining the neutral position when an external lateral force acts on the extremity until this lateral force exceeds a limit value that is predefined by the spring, the abutment face and the mating face and, in the process, partially lifts the mating face away from the abutment face, and the flat contact between the abutment face and the mating face becomes at least one of either a line contact and a point of contact.

12. The joint arrangement as claimed in claim 11, wherein the spring is designed as a helical compression spring.

13. The joint arrangement as claimed in claim 11, wherein the support connection piece defines a longitudinal axis as a neutral axis that runs at a right angle to the abutment face.

14. The joint arrangement as claimed in claim 13, wherein, in the neutral position of the joint part, the longitudinal axis of the joint part coincides with the neutral axis, and the extremity runs in the direction of the longitudinal axis of the joint part.

15. The joint arrangement as claimed in claim 11, wherein the joint part has an outer side wall as a radial stop that interacts with an inner side wall, as a mating stop, which is firmly arranged with respect to the support connection piece, as a result of which the joint part is held in a defined radial position in each pivoting position.

16. The joint arrangement as claimed in claim 15, wherein the contour of the outer side wall, as a radial stop for the first joint part, is in the form of a first polygon and interacts with an inner side wall, as a mating stop, of which the contour forms a second polygon, in such a way that the first polygon engages in the second polygon, with radial play being provided to such an extent that deflection of the joint part is still possible without this leading to tilting and provides security against twisting.

17. The joint arrangement as claimed in claim 11, further comprising an elastic flange that rests against the extremity in a sealing manner by way of an inner edge, the elastic flange being connected to the support connection piece by way of its outer edge.

18. The joint arrangement as claimed in claim 11, wherein the support connection piece has an annular centering disk that forms the abutment face and, possibly, the radial mating stop by way of its inner side wall, and the annular centering disk includes plastic.

19. A sanitary fitting comprising an outlet unit having an outlet pipe, the outlet pipe being connected to a mixed water line and the joint arrangement as claimed in claim 11.

20. The sanitary fitting as claimed in claim 19, wherein a connection part forms a flow connection with the outlet pipe and, for its part, has a connection for the mixed water line.

21. The sanitary fitting as claimed in claim 19, wherein the outlet pipe is rotatably mounted in the second joint part.

22. The sanitary fitting as claimed in claim 19, wherein a further light source is present, with the light from said further light source being emitted into the outlet pipe, with a light guide additionally being provided in the outlet pipe such that it starts from said further light source.

23. The sanitary fitting as claimed in claim 19, wherein the mixing valve unit has an input for a cold water line and a hot water line and has an output on which the mixed water line is connected.

24. A sanitary fitting comprising a joystick to steplessly choose at least a water temperature by controlling a mixing value unit, wherein the joystick includes the joint arrangement as claimed in claim 11.

25. The sanitary fitting as claimed in claim 24, wherein the joystick steplessly chooses the water temperature and a quantity of water by actuating the mixing valve unit.

26. The sanitary fitting as claimed in claim 24, wherein the joint arrangement of the joystick includes an extremity in a form of an operating lever.

27. The sanitary fitting as claimed in claim 26, wherein a light signal can be emitted in a free end region of the operating lever, with a light source being arranged either in the free end region and being supplied with power by a current conductor in an interior of the operating lever, or alternatively light being conducted into the free end region by means of a light guide which runs through the operating lever, and the free end region being selectively closed by a transparent covering.

* * * * *